May 19, 1936.  F. PERRY  2,041,300
VALVE STEM AND HANDLE LOCKING MEANS
Filed Dec. 6, 1933
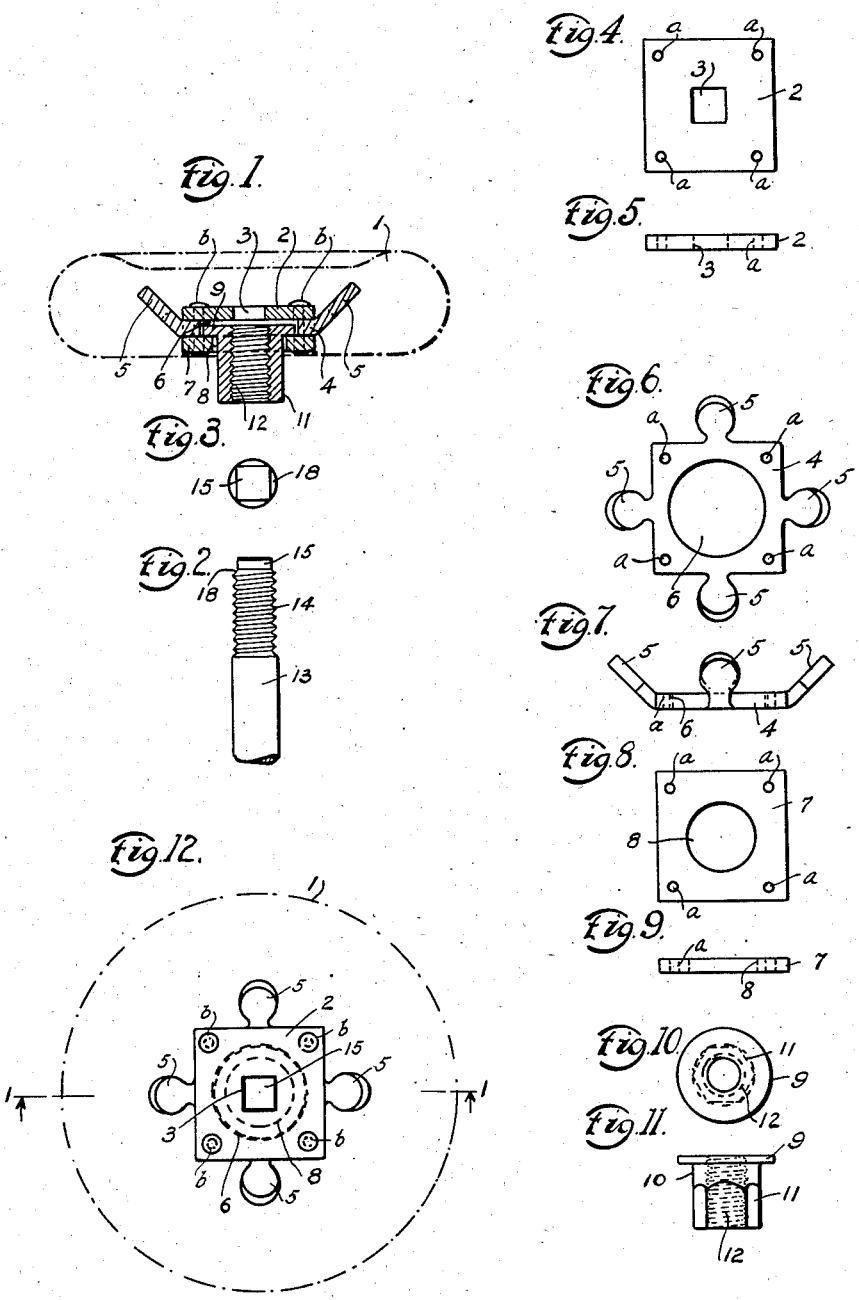
INVENTOR
Frank Perry;
BY
Harold D. Penney, ATTORNEY.

Patented May 19, 1936

2,041,300

UNITED STATES PATENT OFFICE 2,041,300

VALVE STEM AND HANDLE LOCKING MEANS

Frank Perry, New York, N. Y.

Application December 6, 1933, Serial No. 701,093

9 Claims. (Cl. 287—53)

The present invention relates to an improvement in the manner of attaching valve handles or wheels to the stems or spindles of valves such as are used to cut off or open up fluid pressures in pipe lines and the like.

The main feature of the present construction is to provide a simple wheel-stem attaching means which is normally concealed, and therefore not exposed to easy tampering or injury.

Another feature is in the provision of a strong fastening means, easily manipulated, with proper tools.

Another feature of the present structure eliminates the usual external wheel nut or set screw, and permits the provision of a smooth surface on the top of the wheel, such surface being unbroken by any fastening means.

These and other capabilities will be apprehended as the herein description proceeds, and it is obvious that modifications may be made in the structure herein without departing from the spirit hereof or the scope of the appended claims.

In the drawing,

Fig. 1 is a sectional view of the valve stem attaching means, shown with the valve stem removed, taken on line 1—1 Fig. 12, looking in the direction of the arrows;

Fig. 2 is a side elevation of a valve stem or spindle broken away from its valve portion;

Fig. 3 is a plan view of the stem to show its squared and shouldered section;

Fig. 4 is a plan view of the stem key plate;

Fig. 5 is a side elevation thereof;

Fig. 6 is a plan view of the anchor plate, removed from its assembly with the key plate and flange plate;

Fig. 7 is a side elevation thereof;

Fig. 8 is a plan view of the flange plate;

Fig. 9 is a side view thereof;

Fig. 10 is a plan view of the captive stem nut, removed from its assembled position;

Fig. 11 is an elevational view thereof; and

Fig. 12 is a plan view of the assembled structure of Fig. 1.

As in Figs. 1 and 12, the present stem locking structure is comprised of the assembled structures shown in Figs. 4 to 11 inclusive.

In Fig. 1, the top or stem engaging key plate 2, preferably rectangular in contour as in the plan view, Fig. 4, is provided with a central rectangular opening 3, and at each corner is located a rivet hole $a$.

Assembled immediately below said key plate 2, is located an anchor plate 4, of the same general contour as the key plate 2, but which is provided with a central cylindrical bore 6; a plurality of rivet holes $a$—$a$, to match with bores $a$—$a$ of the key plate 2. The anchor plate is further provided with a plurality of integral, upwardly bent, headed arms 5—5—5—5, these being provided to anchor the assembled stem lock within the interior of the moulded handwheel 1 shown dotted about the assembled parts, in Fig. 1.

Below the anchor plate 4, is located a flange plate 7, having a bore 8 thereon to rotatably support a flanged threaded stem lock bushing 10, Figs. 10 and 11, by its flange 9, which flange 9 rotatably fits in bore 6 of anchor plate 4.

The plate assembly as above described is riveted together by rivets $b$, in rivet holes $a$, thus assembling the plate structures firmly together, but leaving the threaded stem lock rotatably assembled in the bore 6 of anchor plate 4 and between stem key plate 2 and flange plate 7.

After this assembly, the structure is then molded into the interior of a smooth handle structure of the usual materials, indicated by the dotted outline 1, Fig. 1, and as thus located, leaves the lower face of flange plate 7 and the lower end 11 of the lock bushing 10 exposed.

The lock bushing, besides the flange 9 previously described, and its bushing portion, has its bushing portion bored and threaded as at 12, Figs. 10 and 11. Further, its lower end may be provided with polygonal faces, generally denoted by 11, to receive a wrench.

After the parts have been assembled and molded into the handle portion 1, as previously described, it is then ready to be locked on to a valve stem or spindle 13, such as is shown in Fig. 2. The stem has a cylindrical portion 13, which, near the upper end thereof is threaded as at 14, and the outer extension thereof being squared as at 15, this being shown in Fig. 3.

To lock the handwheel to the stem 13, the upper squared end 15 is introduced into the threaded bore 12 of bushing 10, and the bushing revolved until it draws the stem by its threaded end 14, until the squared end 15, contacts with key plate 2. The squared end 15 of stem 13 is then entered into key aperture 3 of plate 2, and the bushing 10 is then further rotated until the shoulder 18 of stem 13 is firmly seated against the bottom face of key plate 2, and the assembly is thus locked together onto stem 13.

As previously noted, the handle is smooth and the stem locking means is concealed.

What I claim is:

1. A stem lock for valve handles, comprising in combination a molded handle; a plurality of superposed plates molded therein and forming, respectively, a valve stem key plate; an anchor plate, a flange plate, and a threaded valve stem bushing rotatably supported between said key plate and flange plate.

2. A stem lock for valve handles, comprising in combination a molded handle; a plurality of superposed plates molded therein and forming, respectively, a valve stem key plate; an anchor plate; a flange plate, all said plates being riveted together and a captive threaded valve stem bushing rotatably supported between said key plate and flange plate.

3. The combination of a handwheel having an unbroken surface on one side thereof, a plate fixedly held within the handwheel and having an angular opening therein, a threaded valve stem having an angular end, and a threaded collar freely revolvable in said handwheel and having an external projection, said projection being engageable with said stem, whereby to draw said end into the angular opening and to jam the stem endwise against said plate.

4. The combination of a handwheel having an unbroken top surface, a locking plate fixedly disposed within said wheel and having an angular opening therein; a threaded valve stem vertically disposed below said wheel and having a top angular terminal, and a threaded collar having its top end freely revolvable in said wheel, said collar having its lower end projecting from the lower surface of said wheel and being practically concealed thereby, said lower end being engageable with the threads of said stem whereby to draw said terminal into locked engagement in said opening, and means to lock the collar and handwheel against relative rotation.

5. An attachment for valve stems comprising in combination with a stem having a threaded end, and an angular terminal; a handwheel having on one of its flat sides an unbroken surface; a locking plate fixedly disposed within the wheel and having an angular opening therein, another plate spaced from the first plate and having its outer surface flush with the opposite surface of said wheel, said second plate having a relatively large opening coaxial with the first opening; and an internally threaded bushing disposed in the large opening and having a flanged end freely revolvable in the aforesaid space, said bushing having its threads engageable with the first threads, whereby to draw said terminal into locked engagement in said angular opening.

6. An attachment for valve stems comprising in combination with a stem having a threaded end, and an angular terminal; a handwheel having an unbroken flat side; locking means fixedly disposed within the wheel and including a plate having therein an angular opening, another plate rigid with the first plate and providing an interposed space, said second plate having its outer face flush with the opposite side of the wheel and there being a relatively large opening in the second mentioned plate, said latter opening being coaxial with the first opening; an internally threaded bushing revolvably disposed in the large opening; said bushing including a flanged end which is disposed in said space, an outwardly projecting end; said latter end having its threads engageable with the threads of said stem, and angular outer faces provided on the last mentioned end, whereby to revolve the latter so as to draw said terminal into the angular opening and jamming engagement with the locking plate.

7. In combination, a handle having secured therein a key plate provided with an angular opening, and a flange plate rigidly spaced from said key plate and having a central bore coaxial with said opening; a bushing disposed in said bore and having interior threads, a tool receiving portion, and a lateral flange at its upper end disposed between the key plate and flange plate; and a threaded stem engageable in said bushing and provided at its upper end with an angular end adapted to fit in said angular opening and forming a shoulder on the stem adapted to jam against the lower face of the key plate when the flange jams against the flange plate.

8. In combination, a handle having secured therein a key plate provided with an angular opening, and a flange plate rigidly spaced from said key plate and having a central bore; an interiorly threaded bushing disposed in said bore and having a tool receiving portion and a lateral flange disposed between the key and flange plates; and a threaded stem engageable in said bushing and provided at its upper end with an angular end adapted to fit in said angular opening and forming a shoulder on the stem adapted to jam against the key plate; continued rotation of the bushing moving the angular end into the angular opening and forcing said shoulder into jamming engagement with the key plate and forcing the flange into jamming engagement with the flange plate, thereby to lock the bushing against creeping around on the stem, whereby the handwheel is held rigidly fixed relative to the stem.

9. In combination, an anchor plate having a large central bore and upwardly bent arms at the edges; a key plate disposed flat on said anchor plate and provided with a central rectangular opening; a flange plate disposed flat under said anchor plate and having a central bore; rivets passing through all of said plates and securing them flat together; said bores and opening being coaxial, the anchor plate bore being largest and the key opening smallest, thereby to form an interior annular groove around the large bore; a hand wheel molded around and over said plates and arms flush with the lower face of the lower plate; an interiorly threaded bushing disposed in the bores and having a wrench receiving lower portion, a lateral flange at its upper end disposed in said groove between the key and flange plates, and interior threads extending from end to end of the bushing; and a threaded stem engageable in said bushing and provided at its upper end with a squared end adapted to fit in said rectangular opening and forming a shoulder on the stem adapted to jam against the lower face of the key plate and force the flange into jamming engagement with the flange plate.

FRANK PERRY.